(12) United States Patent
Choi et al.

(10) Patent No.: US 8,255,874 B2
(45) Date of Patent: Aug. 28, 2012

(54) APPARATUS AND METHOD FOR AUTOMATICALLY EXTRACTING INTERFACE OF EMBEDDED SOFTWARE

(75) Inventors: Byoung-Ju Choi, Gangnam-gu (KR);
Joo-Young Seo, Songpa-gu (KR);
Ah-Young Sung, Bucheon-si (KR);
Kwang-Hyun La, Anyang-si (KR);
Sung-Bong Kang, Seocho-gu (KR);
Ki-Cheol Lee, Hwaseong-si (KR);
Yong-Hun Kim, Songpa-gu (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1153 days.

(21) Appl. No.: 12/018,348

(22) Filed: Jan. 23, 2008

(65) Prior Publication Data
US 2008/0270996 A1    Oct. 30, 2008

(30) Foreign Application Priority Data
Apr. 25, 2007    (KR) ........................ 10-2007-0040127

(51) Int. Cl.
*G06F 9/44*    (2006.01)
(52) U.S. Cl. ......... 717/124; 717/125; 717/126; 717/135
(58) Field of Classification Search ........................ None
See application file for complete search history.

(56) References Cited

U.S. PATENT DOCUMENTS

| | | | |
|---|---|---|---|
| 5,740,352 A * | 4/1998 | Philipp et al. ................... | 714/40 |
| 6,938,243 B1 * | 8/2005 | Zeevi et al. .................... | 717/124 |
| 6,986,125 B2 * | 1/2006 | Apuzzo et al. ................. | 717/124 |
| 7,047,176 B2 * | 5/2006 | Klevans et al. ................. | 703/21 |
| 7,093,238 B2 * | 8/2006 | Givoni et al. .................. | 717/129 |
| 7,210,128 B2 * | 4/2007 | Fallah et al. ................... | 717/135 |
| 7,243,059 B2 * | 7/2007 | Crowell ......................... | 703/22 |
| 7,404,178 B2 * | 7/2008 | Cepulis ......................... | 717/124 |

(Continued)

FOREIGN PATENT DOCUMENTS
KR    1020010038541 A    5/2001
(Continued)

OTHER PUBLICATIONS

Wei-Chung Cheng et al, Power-Aware Bus Encoding Techniques for I/O and Data Busses in an Embedded System, 2002—atrak.isc.edu, 16 pages, <http://atrak.usc.edu/~massoud/Papers/palette-recoding-journal.pdf>.*

(Continued)

*Primary Examiner* — Thuy Dao
*Assistant Examiner* — Cuong V Luu
(74) *Attorney, Agent, or Firm* — Volentine & Whitt, PLLC

(57) ABSTRACT

Provided is an apparatus and method for automatically extracting an interface of embedded software. The method defines an interface of embedded software as a test item for test of the interface of the embedded software, and generates an interface symbol corresponding to the defined test item. The location of the interface symbol is determined, and a test case is generated based on the interface symbol and its location in the software. Embodiments of the invention thus facilitate the testing of software at interfaces between layers in the software.

13 Claims, 14 Drawing Sheets

U.S. PATENT DOCUMENTS

| | | | |
|---|---|---|---|
| 7,950,004 B2 * | 5/2011 | Vieira et al. | 717/125 |
| 2001/0049594 A1 * | 12/2001 | Klevans | 703/14 |
| 2003/0037314 A1 * | 2/2003 | Apuzzo et al. | 717/125 |
| 2003/0126517 A1 * | 7/2003 | Givoni et al. | 714/46 |
| 2004/0215440 A1 * | 10/2004 | Crowell | 703/22 |
| 2004/0250244 A1 * | 12/2004 | Albrecht | 717/135 |
| 2005/0028146 A1 * | 2/2005 | Quick | 717/130 |
| 2005/0289517 A1 * | 12/2005 | Balfe et al. | 717/126 |
| 2006/0253739 A1 | 11/2006 | Godefroid et al. | |
| 2007/0214451 A1 * | 9/2007 | Watzl | 717/129 |
| 2007/0234314 A1 * | 10/2007 | Godwin et al. | 717/136 |
| 2008/0282229 A1 * | 11/2008 | Kim et al. | 717/124 |

FOREIGN PATENT DOCUMENTS

| | | | |
|---|---|---|---|
| KR | 1020040087767 A | 10/2004 | |
| KR | 1020050111323 A | 11/2005 | |
| KR | 1020070021879 A | 2/2007 | |
| WO | 2004072733 A2 | 8/2004 | |

OTHER PUBLICATIONS

Yu-Jung Huang, Design of LCD Driver IP for SOC Applications, 2004 IEEE, pp. 62-65, <http://ieeexplore.ieee.org/stamp/stamp.jsp?tp=&arnumber=1349405>.*

Alexander G. Dean, Software Thread Integration for Embedded System Display Applications, ACM, vol. 5, No. 1, Feb. 2006, pp. 116-151, <http://dl.acm.org/citation.cfm?id=1132357.1132362>.*

Philip Garcia, An Overview of Reconfigurable Hardware in Embedded Systems, EURASIP Journal on Embedded Systems vol. 2006, pp. 1-19, <http://dl.acm.org/citation.cfm?id=1288223.1288236>.*

Jooyoung Seo, Automating Embedded Software Testing on an Emulated Target Board, 2007 IEEE, 7 pages, <http://ieeexplore.ieee.org/stamp/stamp.jsp?tp=&arnumber=4296720>.*

Yervant Zorian, Testing Embedded-Core-Based System Chips, 1999 IEEE, pp. 52-60, <http://ieeexplore.ieee.org/stamp/stamp.jsp?tp=&arnumber=769444>.*

* cited by examiner (a) Kernel Space (b) User Space

Fig. 14

```
Break.set &bp              /* __arch_copy_from_user(), __arch_strncpy_from_user(), 
Set BP at call location of get_user() */
&size=r(R2)                                      /* Obtain size from R2 register*/
&addr_range = &bp + &size                        /* Add BP and size */
&kernel_sp=r(R13_SVC)              /* Read SP of kernel stack from R13_SVC register */
IF "&kernel_sp"<="&addr_range" && "&p_addr"<="Kernel_Stack_Base"  /* compare the sum with kernel stack */
Print                                  Kernel Stack_Base"           Collision!
ELSE "Pass!!"                                "Fail.
```

APPARATUS AND METHOD FOR AUTOMATICALLY EXTRACTING INTERFACE OF EMBEDDED SOFTWARE

CROSS-REFERENCE TO RELATED APPLICATIONS

This U.S. non-provisional patent application claims priority under 35 U.S.C. §119 of Korean Patent Application No. 10-2007-0040127, filed on Apr. 25, 2007, the entire contents of which are hereby incorporated by reference.

BACKGROUND OF THE INVENTION

1. Field of the Invention

The present invention disclosed herein relates to embedded software test, and more particularly but not by way of limitation, to a method for automatically generating a test case.

2. Description of Related Art

Typical embedded software is tested by monitoring and debugging an emulator. The monitoring may be synchronous or asynchronous. In synchronous monitoring, a source code debugger such as the remote Kernal GNU DeBugger KGDB is used to stop a program at a certain location in a source code and monitor a value of the corresponding location. In asynchronous monitoring, an independent monitoring daemon is used to monitor the entire embedded software, which may lead to inaccurate measurement of a source code that is to be monitored.

In both the synchronous monitoring scheme and the asynchronous monitoring technique, a code area, a data area, global variables, and a stack area may be monitored. Many such tests are performed on an ad-hoc basis rather than on an objective basis because determination of monitoring target symbols and analysis of the results may vary depending on the developers' experience/knowledge levels. Furthermore, simple monitoring techniques focus on test automation rather than identification of a test target (i.e., an input of a test case), generation of the test case, and analysis of the test results.

Embedded software is typically linked with hardware, a hardware abstraction layer (HAL), an OS kernel, device drivers, and upper-level application software. In an embedded system, the interfaces between such layers must be tested. This is, however, difficult to achieve using conventional test technology.

SUMMARY OF THE INVENTION

An embodiment of the invention provides an apparatus and method for automatically extracting interface symbols to test an interface of embedded software.

An embodiment of the invention also provides an apparatus and method for automatically generating a test case to test an interface of embedded software.

An embodiment of the invention provides a method for testing software. The method includes: identifying an interface test feature associated with the software, the interface test feature being associated with an interface symbol, the interface symbol enabling measurement of the interface test feature; and extracting a location in the software associated with the interface symbol.

An embodiment of the invention provides an apparatus for testing software. The apparatus includes: a test target analyzer configured to receive the software, identify at least one interface between a plurality of layers in the software, and identify a location in the software for the at least one interface; and a test case generator coupled to the test target analyzer, the test case generator configured to generate a test case for the software based on the identified at least one interface and the location.

Embodiments of the invention thus facilitate the testing of software at interfaces between layers in the software.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures:

FIG. 14 illustrates a test script for test of collision with an $OPI_{3\_6}$ kernel stack;

DETAILED DESCRIPTION OF EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

An embodiment of the invention provides an apparatus and method for automatically generating a test case for a LINUX-based LCD device driver. In this instance, an evaluation board can be emulated prior to actual product development. An embodiment of the invention exemplifies an LCD device driver as embedded software.

Figure 1:
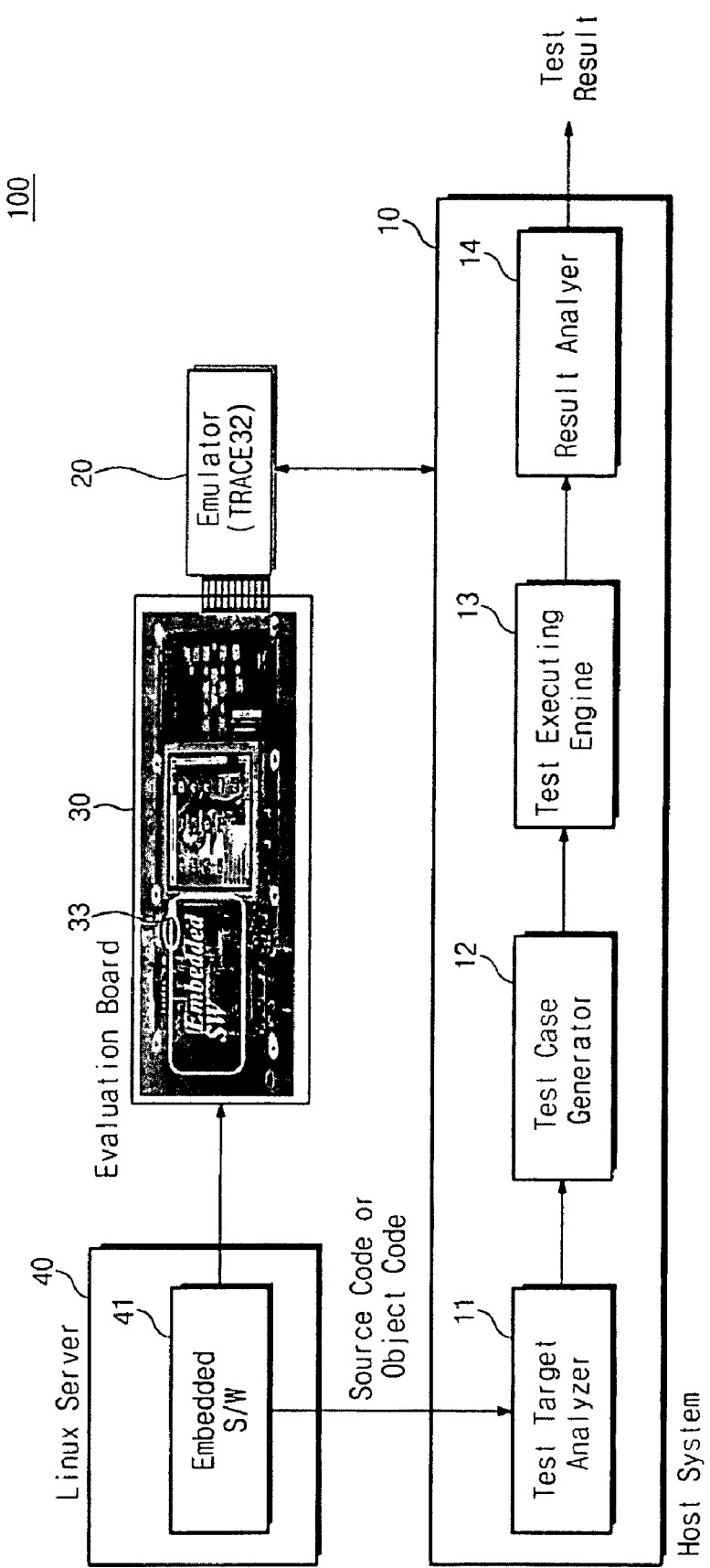
FIG. 1 is a block diagram of an embedded software test system according to an embodiment of the present invention.

FIG. 1 is a block diagram of an embedded software test system according to an embodiment of the present invention.

Referring to FIG. 1, a test system 100 for embedded software includes a host system 10, an emulator 20, an evaluation board 30, and a LINUX server 40. The LINUX server 40 includes embedded software 41.

The host system 10 generates a test case for testing an interface of the embedded software 41. In addition, the host system 10 controls the emulator 20 to execute the generated test case. The emulator 20 executes the test case generated by the host system 10, and outputs the results. The evaluation board 30 is provided to test the embedded software 41 together with hardware. The LINUX server 40 loads the embedded software 41 into the evaluation board 30 under the control of the emulator 20.

The host system 10 includes a test target analyzer 11, a test case generator 12, a test executing engine 13, and a result analyzer 14. The test target analyzer 11 receives a source (or object) code of the embedded software 41 from the LINUX server 40. From an executable linker format (ELF), the test target analyzer 11 automatically identifies a location in the source (or object) code where an interface symbol corresponding to each interface is mapped. The test case generator 12 generates a test case for testing the interface of the embedded software 41. The test case is generated in a script format so that it can be executed in the emulator 20. The test execution engine 13 receives the test case from the test case generator 12, provides the received test case to the emulator 20, and controls the emulator 20. The result analyzer 14 receives the execution results of the test case from the emulator 20, and analyzes the received execution results.

Variations to the embodiment illustrated in FIG. 1 are possible. For example, a server other than a LINUX server may be used, and code formats other than those specified above may also be used, according to design choice. Likewise, the emulator 20 must not necessarily be a TRACE32 emulator as indicated in FIG. 1 and as described below.

The present invention tests the structure of embedded software (i.e., an LCD device driver) loaded into an embedded system, for example a mobile application (AP), and tests an interface in an LCD emulation test.

Figure 2:
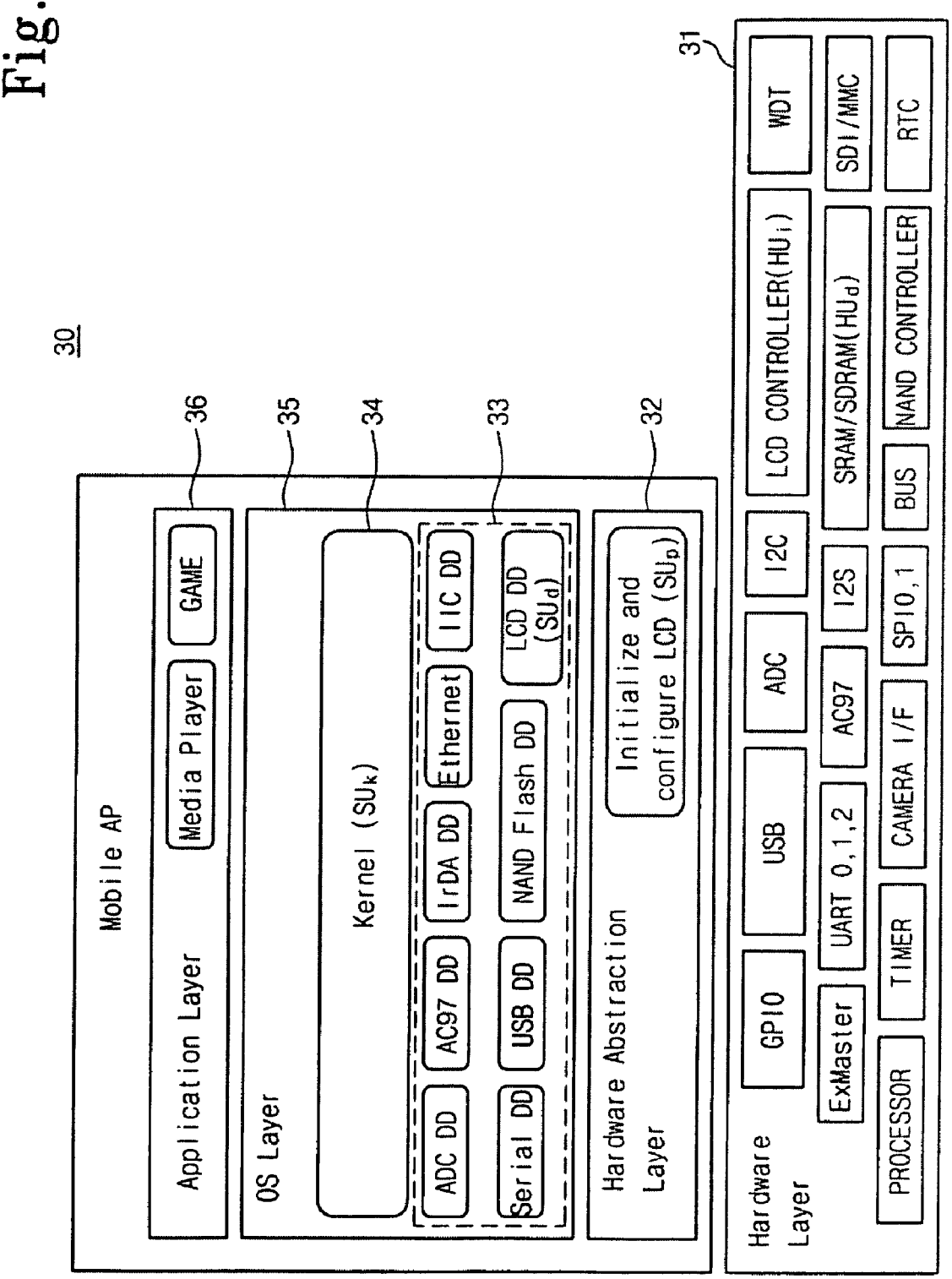
FIG. 2 is a block diagram of an embedded system according to an embodiment of the present invention.

FIG. 2 is a block diagram of an embedded system according to an embodiment of the present invention. In the test environment, the embedded system is embodied in the evaluation board 30. Hence, the embedded system of FIG. 2 is also referred to herein as the embedded system 30.

Referring to FIG. 2, the embedded system 30 includes a physical hardware layer 31, a hardware abstraction layer (HAL) 32, an operation system (OS) layer 35, and an application layer 36. The OS layer 35 includes embedded software 33 and kernel software 34.

The embedded system 30 may include a variety of device drivers for supporting physical devices mounted on the evaluation board 30, examples of which include data transfer-related device drivers (such as a USB driver and a serial bus driver) and audio-related device drivers such as Audio code 1997 (AC97) and Infrared Data Association (IrDA) links.

The embedded software 33 runs in such a way that software units in respective layers are tightly coupled with each other. The software units in the respective layers are classified into a kernel-dependent software unit ($SU_k$), a device-dependent software unit ($SU_d$), and a processor-dependent software unit ($SU_p$). An exemplary $SU_k$ is an OS application program interface for providing an OS service. An exemplary $SU_d$ is software of an LCD controller for supporting a physical device. An exemplary $SU_p$ is software of the HAL 32, which is dependent on a target processor, such as for hardware device initialization and configuration.

Figure 3:
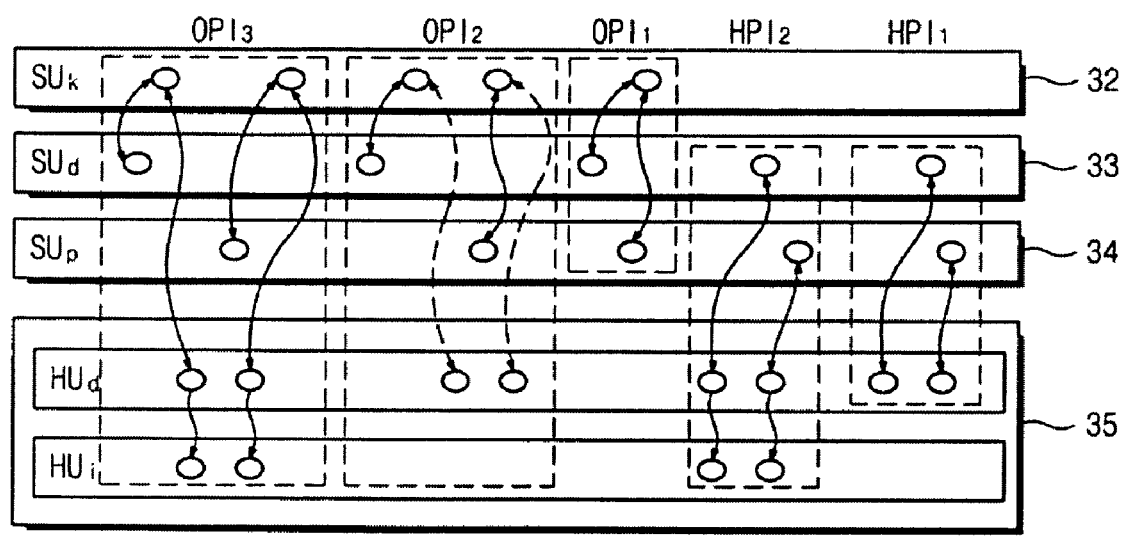
FIG. 3 illustrates interfaces of the embedded system illustrated in FIG. 2 according to an embodiment of the present invention.

FIG. 3 illustrates interfaces of the embedded system illustrated in FIG. 2 according to an embodiment of the present invention.

Referring to FIGS. 2 and 3, the embedded software is tightly coupled with hardware units as well as with the software units mentioned above. The software units are directly connected to the hardware units when a desired value needs to be read and written through a random access memory (RAM) or a register. The hardware units are subdivided into a hardware unit_d ($HU_d$) and a hardware unit_i ($HU_i$), depending on their structures for coupling with the software units. Examples of the $HU_d$ include RAMs and registers that can be directly read/written from software to hardware. Examples of the $HU_i$ include universal asynchronous receiver/transmitters (UARTs), universal serial buses (USBs), and watchdog timers (WDTs) whose read/write operations are indirectly controlled through an address of the hardware unit_d $HU_d$. Hardware-dependent Part Interfaces (HPI's) are divided into $HPI_1$ and $HPI_2$. Using an $HPI_1$, the $SU_d$ or the $SU_p$ accesses the $HU_d$ to read/write an expected value. Using an $HPI_2$, the $SU_d$ or the $SU_p$ controls the $HU_i$ through the address of the $HU_d$.

The LCD controller of the LCD device driver exemplified herein corresponds to the $HU_i$.

Referring to FIGS. 2 and 3, for analysis of an interface with the OS layer, a control flow of the OS varies depending on the types of OS services such as process management, inter-process communication and synchronization, exception handling, virtual memory management, physical memory management, time management, interrupt handling, IO management, networking, and file system management. That is, on the basis of a control flow for each OS service, OS-dependent Part Interfaces (OPI's) are divided into an $OPI_1$, an $OPI_2$, and an $OPI_3$. Using the $OPI_1$, the $SU_d$ or the $SU_p$ calls an $SU_k$ irrelevant to $HU_d$/$HU_i$ control. In this case, the $SU_k$ corresponds to an application programming interface (API) for process management, inter-process communication, and exception handling. Using the $OPI_2$, the $SU_d$ or the $SU_p$ calls a $SU_k$ relevant to $HU_d$ control. In this case, the $SU_k$ corresponds to an API for virtual memory management. Using the $OPI_3$, the $SU_d$ or the $SU_p$ calls a $SU_k$ relevant to the $HU_d$/$HU_i$ control. In this case, the $SU_k$ corresponds to an API for physical memory management, time management, interrupt handling, IO management, networking, or file system management.

The five interfaces illustrated in FIG. 3 become the criteria of test coverage for testing an interface of the embedded software. Each interface is associated with a symbol for test case selection and pass/fail determination, and is further associated with a monitoring location for detecting the cause(s) of a fault in a debugging process. Interface test coverage requires testing of all applicable interfaces. The applicable interfaces are determined according to interface characteristics in the embedded software being tested.

An OS of an exemplary LCD device driver is based on LINUX. Therefore, the device driver follows the LINUX standard file operations, and upper-level application software can invoke (or enable) the device driver only through standard file operations such as a function open( ), a function close( ), a function read( ), a function write( ), a function mset( ), and a function ioctl( ).

Figure 4:
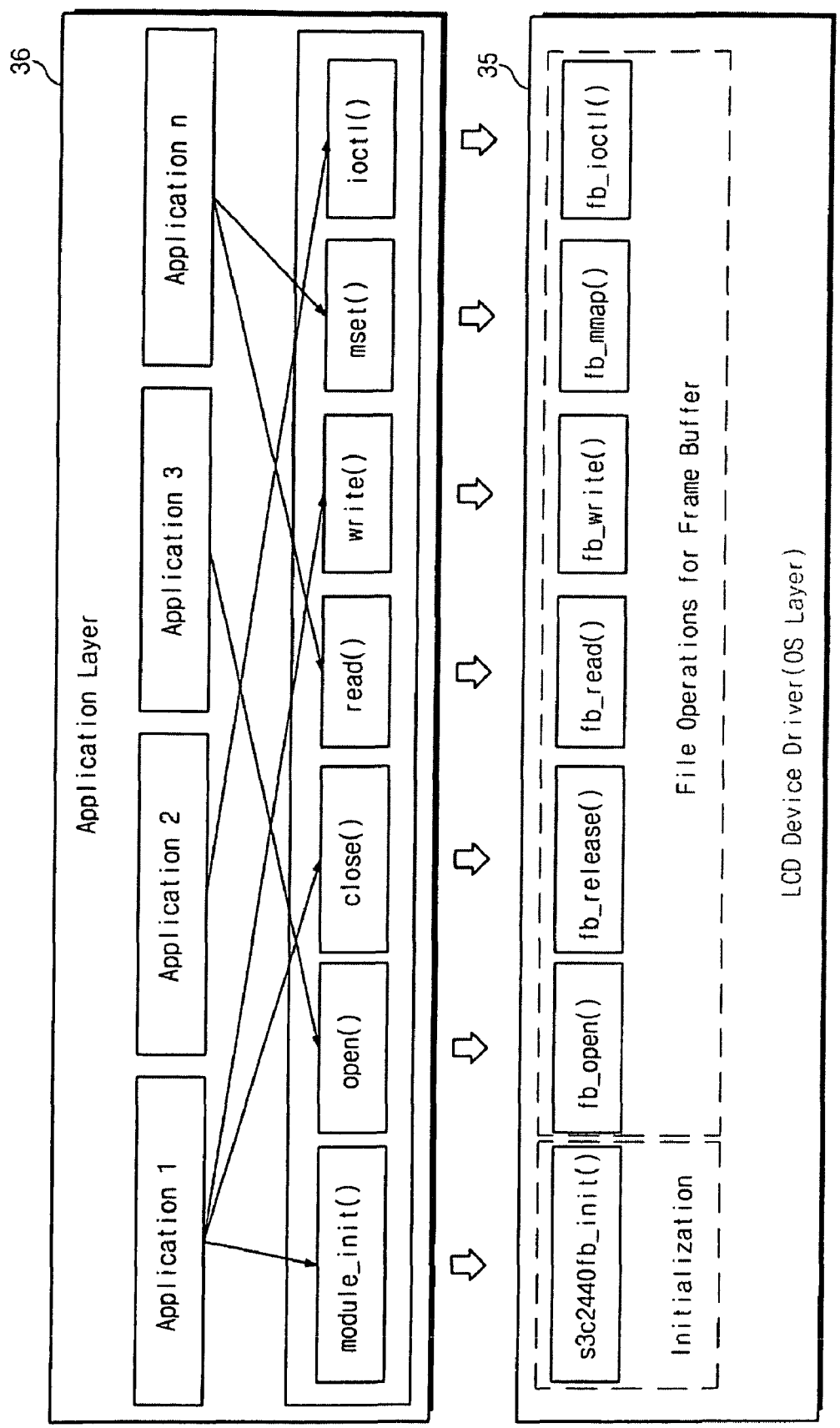
FIG. 4 illustrates standard file operations for an LCD device driver.
Figure 5:
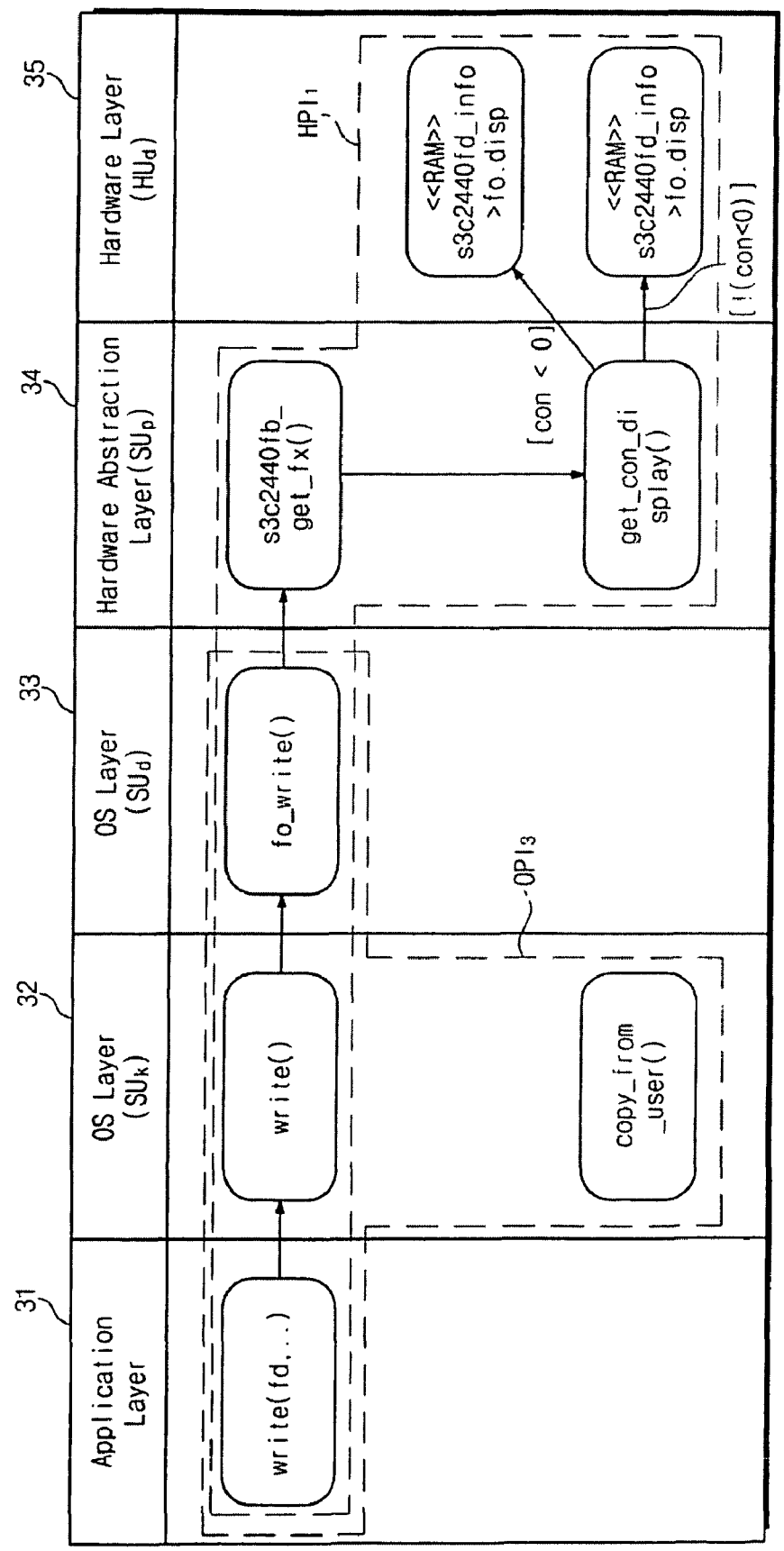
FIG. 5 illustrates an embodiment of the standard file operations illustrated in FIG. 4.

FIG. 4 illustrates a function fb_open( ), a function fb_release( ), a function fb_read( ), a function fb_write( ), a function fb_mmap( ), and a function fb_ioctl( ) that are standard file operations for a frame buffer of the LCD device driver. FIG. 5 illustrates an embodiment of the standard file operations illustrated in FIG. 4. Table 1 shows an interface for the function fb_write( ).

An interface of the LCD device driver is a unit where functions defined in LCD file operations are present between the software unit $SU_k$/$SU_d$/$SU_p$ and the hardware unit $HU_d$/$HU_i$ in a call relationship.

Referring to FIGS. 4 and 5, a function fb_write( ) invoked by a function write( ) uses an $HPI_1$ to write a desired value in a RAM through a function get_con_display( ), and uses an $OPI_3$ to write a user input value in the RAM through a function copy_from_user( ).

TABLE 1

| $SU_k$ | $SU_d$ | $SU_p$ | $HU_d$ | $HU_i$ | Pattern |
|---|---|---|---|---|---|
| — | — | get_con_display | RAM | — | $HPI_1$ |
| copy_from_user( ) | fb_write( ) | — | RAM | — | $OPI_3$ |

The LCD device driver includes a total of 74 interfaces for a function s3c2440fb_init( ), a function fb_open( ), a function fb_release( ), a function fb_read( ), a function fb_write( ), a function fb_mmap( ), and a function fb_ioctl( ). The 74 interfaces are classified into 32 $HPI_1$'s, 2 $HPI_2$'s, and 40 $OPI_3$'s, based on the interface pattern.

Table 2 illustrates the interface test characteristics of the LCD device driver and interface symbols that must be monitored for the respective characteristics.

TABLE 2

| | | Interface Test Characteristics | Interface Symbols |
|---|---|---|---|
| Memory | Memory Map Boundary Check | $HPI_{1\_1}$ Static Memory Map Boundary Check. Test whether a virtual memory area of a static allocation variable is allocated to a physical memory map boundary. | The address and size of a symbol that is statically allocated in a LCD device driver. |
| | Memory Collision | $HPI_{1\_2}$ Kernel Stack Collision Test. Test whether a static allocation variable collides with a kernel stack space. | The type, address and size of a symbol that is statically allocated in a LCD device driver. |
| | | $HPI_{1\_3}$ User Stack Collision Test. Test whether a static allocation variable collides with a user stack space. | The type, address and size of a symbol that is statically allocated in a LCD device driver. |
| Timer | Frame Buffer Performance | $HPI_{2\_1}$ Frame Buffer Response Time Test. Test frame buffer performance. | The start and return times of fb_mmap( ) of a LCD device driver. |
| Interrupt | Interrupt Handler | $OPI_{3\_1}$ Interrupt Context Recovery Test. Test whether the context before an interrupt service is correctly recovered. | The called address of _irq_svc, stmia and ldmia of do_irq( ). |
| | | $OPI_{3\_2}$ Interrupt Latency Test. Test service performance measurements until recovery after the occurrence of an interrupt. | The called address of _irq_svc, stmia and ldmia of do_irq( ). |
| | Interrupt Service Routine | $OPI_{3\_3}$ Normal Interrupt Service Routine Test. Test whether a corresponding service routine is called for a generated interrupt. | The called address of do_irq( ). |
| | | $OPI_{3\_4}$ Abnormal Interrupt Service Routine Test. Test whether a service routine corresponding to an excessive interrupt is correctly called. | The called address of do_irq( ). |
| Memory Management | Memory Map Boundary | $OPI_{3\_5}$ Dynamic Memory Map Boundary Check. Test whether a virtual memory area of a dynamic allocation variable is allocated to a physical memory map boundary. | The address and size of a symbol that is dynamically allocated in a LCD device driver through kmalloc( ). |

TABLE 2-continued

| Interface Test Characteristics | | Interface Symbols |
|---|---|---|
| Memory Collision | $OPI_{3\_6}$ Kernel Stack Collision Test. Test whether a dynamic allocation variable collides with a kernel stack space. | The called addresses of get_user( ), _arch_copy_from_user( ), and _arch_strncpy_from_user( ) in a LCD device driver. |
| | $OPI_{3\_7}$ User Stack Collision Test. Test whether a dynamic allocation variable collides with a user stack space. | The called addresses of put_user( ), _arch_clear_user( ), and _arch_copy_to_user( ) in a LCD device driver. |
| | $OPI_{3\_8}$ Heap Collision Test. Test whether a dynamic allocation variable collides with a memory area of a different variable. | The called addresses of memset( ), _memzero( ), and memcpy( ) in a LCD device driver. |
| Memory Free | $OPI_{3\_9}$ Memory leakage Test. Test whether a dynamically allocated memory area is correctly released. | The called address of kfree( ) in a LCD device driver. |
| | $OPI_{3\_10}$ Memory Free Latency Test. Test of memory release performance measurements. | The called addresses of kfree( ) and kmem_cache_free_one( ) in a LCD device driver. |
| Page Fault | $OPI_{3\_11}$ Mis-Align Check. Test address alignment. | The virtual addresses of symbols in an init section, a code section, and a data section. |
| Critical Region | $OPI_{3\_12}$ Critical Region Test. Test whether a critical region is protected from FIQ. | The addresses of msr, orr/bic, and mrs in a LCD device driver. |

From an executable linker format (ELF) file of a target source, the test target analyzer 11 identifies a location where an interface symbol of the interface test characteristics of the LCD device driver, which is shown in Table 2, is mapped in a test target source code. The ELF file is used to store all information on a source that is programmed by the developer for the use of a debugger. When a call stack is difficult to identify, for example, by backtrace, "objdump" is a command for identifying a source address and "readelf" is a command for indicating ELF file format information.

FIGS. 6 through 13 illustrate interface test items of an LCD device driver, which are shown in Table 2.

Referring to FIGS. 6 through 13, in order to detect a location where the memory-related interface test characteristics of an $HPI_1$ is mapped to the source code, the size and address of a symbol are extracted from an ELF file generated by a command objdump –t and the type of the symbol is extracted from an ELF file generated by a command readelf –wi.

Figure 6:
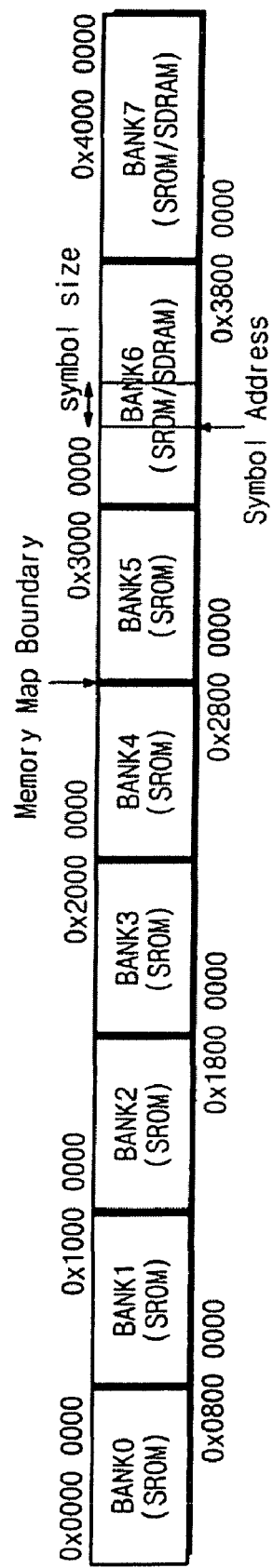
FIGS. 6 through 13 illustrate interface test items of an LCD device driver, which are shown in Table 2.

An $HPI_{1\_1}$ static memory map boundary check is performed to test whether a static global variable ranges over a physical memory map boundary as illustrated in FIG. 6. Thus, the address and size of the static global variable are an interface of the $HPI_{1\_1}$.

Figure 7:
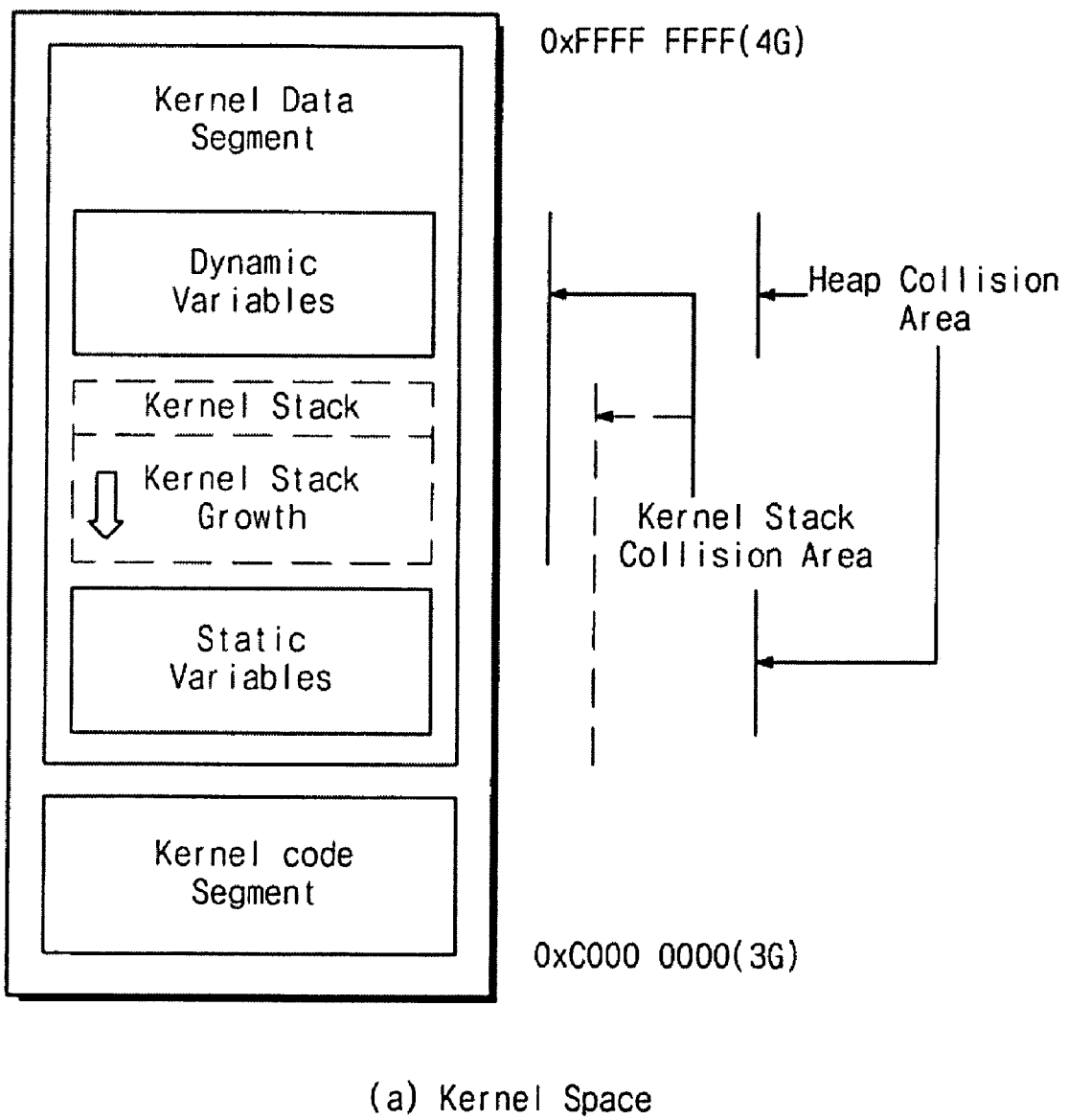

An $HPI_{1\_2}$ kernel stack collision test is used to test whether a static global variable collides with a kernel stack as indicated by a dotted line in FIG. 7. Thus, the address, size and type of the static global variable are an interface of the $HPI_{1\_2}$.

Figure 8:
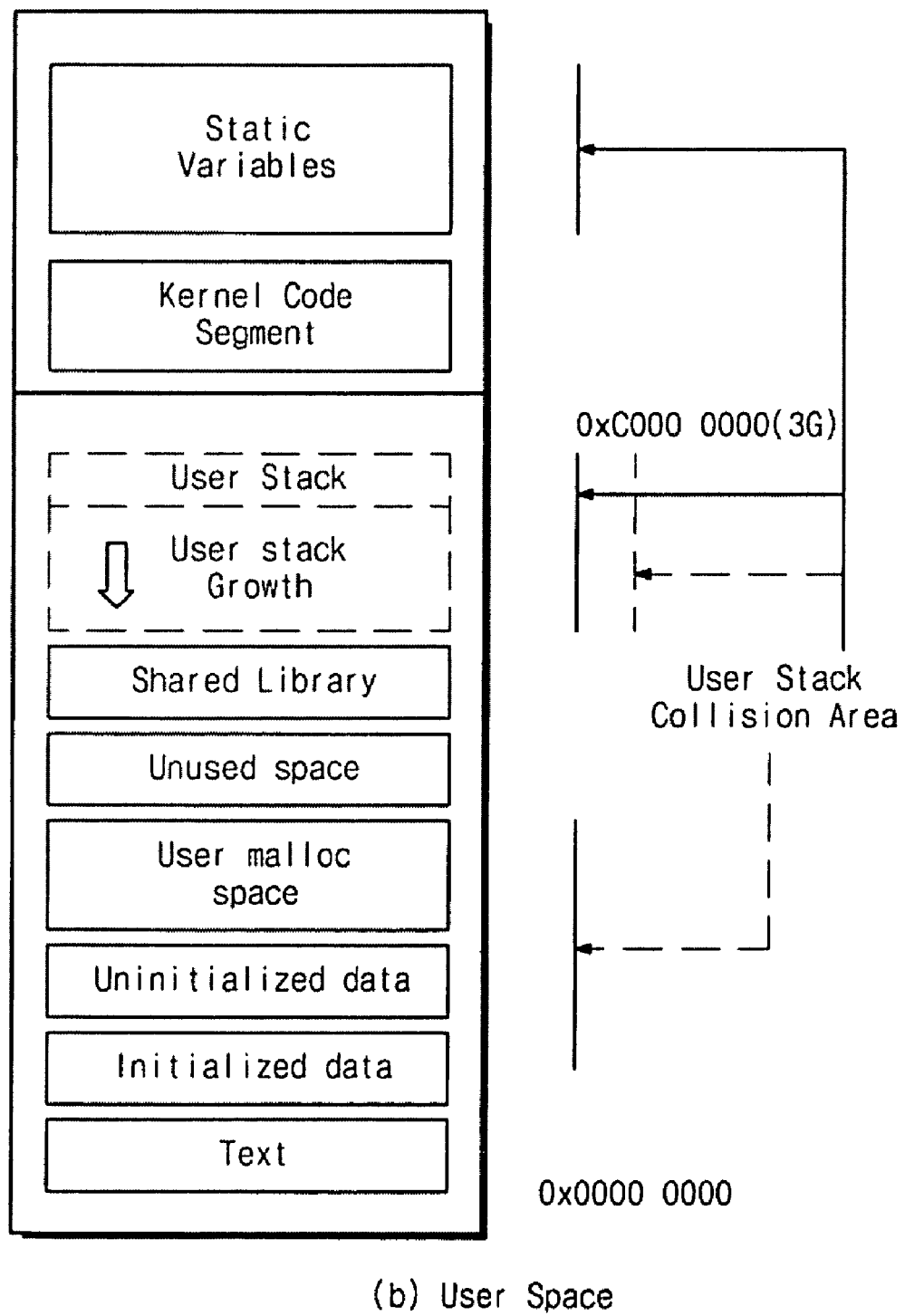

An $HPI_{1\_3}$ user stack collision test is used to test whether a static global variable collides with a user stack as indicated by a dotted line in FIG. 8. Thus, the address, size and type of the static global variable are an interface of the $HPI_{1\_3}$.

In order to detect a location where the timer-related interface test characteristics of an $HPI_2$ are mapped to a source code, a symbol related to a timer of a frame buffer is extracted from an ELF file generated by a command objdump –t.

An $HPI_{2\_1}$ frame buffer response time test measures the time for a function fb_mmap( ) enabled by a function mset( ) of an application, to test a frame buffer response time. The time taken from the start of the function fb_mmap( ) to the return of the function fb_mmap( ) (i.e., completion of memory mapping) is measured. Thus, the called address of the function fb_mmap( ) is an interface of the $HPI_{2\_1}$.

In order to detect a location where the interrupt & memory management-related interface test characteristics of an $OPI_3$ are mapped to a source code, an address for an interface symbol of the $OPI_3$ is extracted from an ELF file generated by a command objdump –lS.

Figure 9:
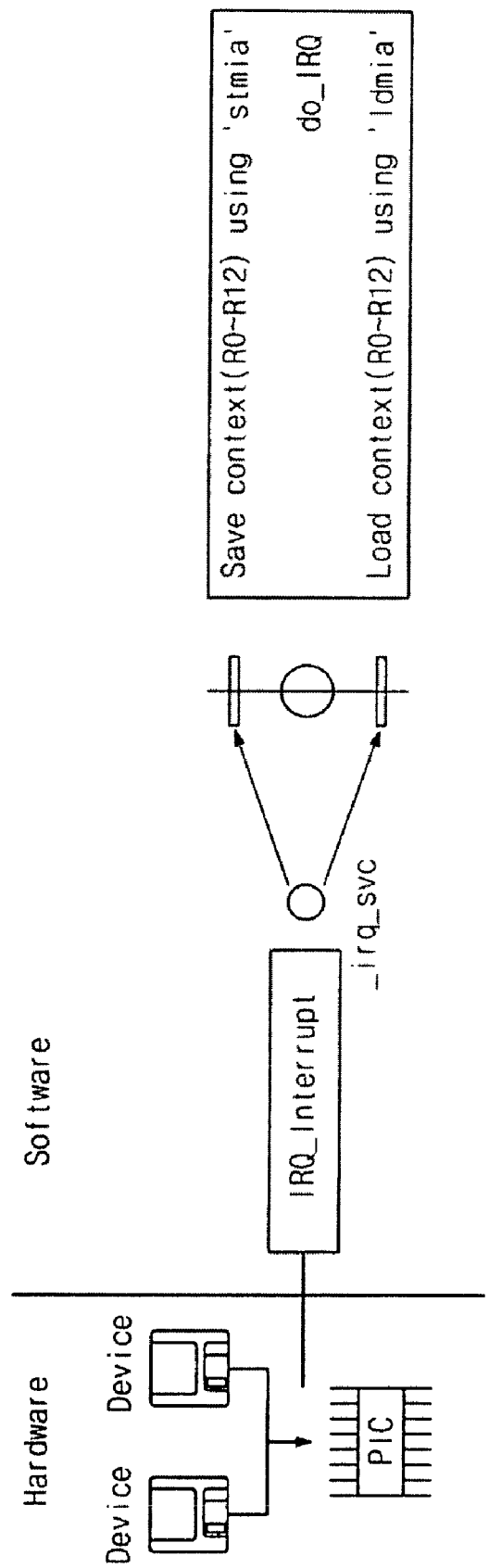

An $OPI_{3\_1}$ interrupt context recovery test is used to test whether a context executed before the occurrence of an interrupt is correctly recovered after the execution of the interrupt. As illustrated in FIG. 9, the called addresses of the register storage and recovery commands stmia and ldmia of do_IRQ after the call of _irq_svc are an interface of the $OPI_{3\_1}$.

The $OPI_{3\_2}$ interrupt latency test is used to measure the time taken from the storage of a context to the recovery of the stored context after the occurrence of an interrupt. Thus, the called addresses of the register storage and recovery commands stmia and ldmia of do_IRQ are an interface of the $OPI_{3\_2}$.

Figure 10:
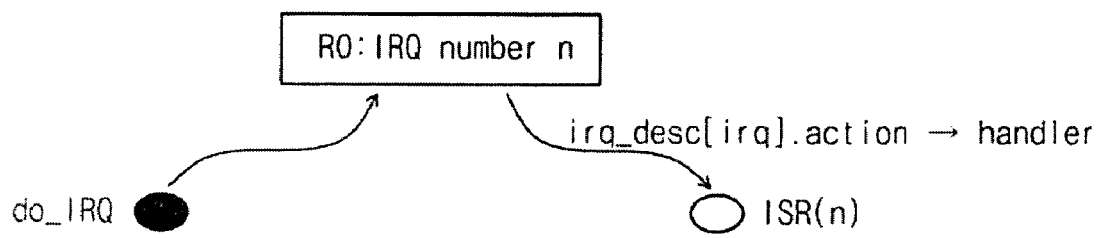

An $OPI_{3\_3}$ normal interrupt service routine test is used to test whether an interrupt service routine (ISR) for a generated interrupt is correctly executed. As illustrated in FIG. 10, when do_IRQ is called due to the generation of an interrupt, an IRQ number is identified from an R0 register and an ISR corresponding to the IRQ number is called by irq_desc[irq].action→handler. Thus, the called address of do_IRQ is an interface of the $OPI_{3\_3}$.

An $OPI_{3\_4}$ abnormal interrupt service routine test is used to test whether an ISR corresponding to an excessive interrupt is correctly executed as many times as the number of generated interrupts as illustrated in FIG. 10. Thus, the called address of do_IRQ is an interface of the $OPI_{3\_4}$.

An $OPI_{3\_5}$ dynamic memory map boundary check is performed to test whether a symbol dynamically allocated by a function kmalloc( ) ranges over a physical memory map boundary as illustrated in FIG. 6. Thus, the called address of the function kmalloc( ) is an interface of the $OPI_{3\_5}$.

An $OPI_{3\_6}$ kernel stack collision test is used to test whether there is a collision with a kernel stack in the case of access to a kernel space by a function _arch_copy_from_user( ), a function _arch_strncpy_from_user( ), and a function get_user( ), as indicated by a solid line in FIG. 7. Thus, the called addresses of the function _arch_copy_from_user( ), the function _arch_strncpy_from_user( ), and the function get_user( ) are an interface of the $OPI_{3\_6}$.

An $OPI_{3\_7}$ user stack collision test is used to test whether there is a collision with a user stack when data of a kernel space move into a user space by a function copy_to_user( ), a function put_user( ), and a function _arch_clear_user( ), as indicated by a solid line in FIG. 8. Thus, the called addresses of the function copy_to_user( ), the function put_user( ), and the function _arch_clear_user( ) are an interface of the $OPI_{3\_7}$.

An $OPI_{3\_8}$ heap collision test is used to test a collision between symbols in a kernel data segment when a function memset( ), a function _memzero( ), and a function memcpy( ) are called, as indicated by a solid line in FIG. 7. Thus, the called addresses of the function memset( ), the function _memzero( ), and the function memcpy( ) are an interface of the $OPI_{3\_8}$.

An $OPI_{3\_9}$ memory leakage test is used to test whether an address allocated by the function kmalloc( ) is released by a function kfree( ). Thus, the called address of the function kmalloc( ) is an interface of the $OPI_{3\_9}$.

Figure 11:
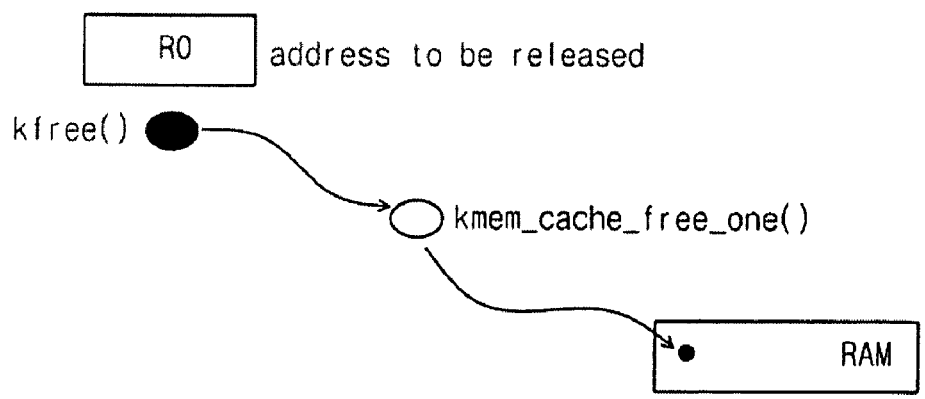

In the case of an $OPI_{3\_10}$ memory free latency test, because a function kfree( ) in a function kmem_cache_free_one( ) disconnects a link of an actual memory when the function kfree( ) is called as illustrated in FIG. 11, the time taken from the call of the function kfree( ) to the call of the function kmem_cache_free_one( ) corresponds to a memory free latency. Thus, the called addresses of the function kfree( ) and the function kmem_cache_free_one( ) are an interface of the $OPI_{3\_10}$.

Figure 12:
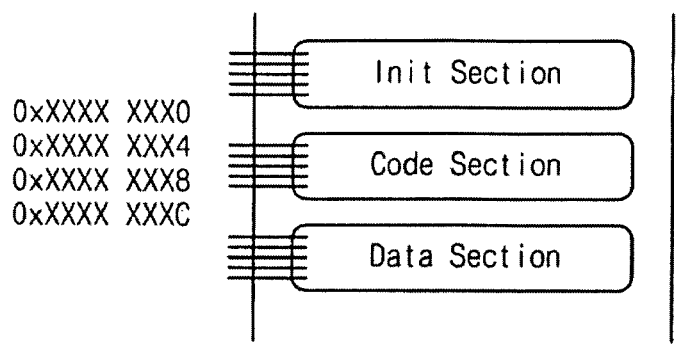

In the case of an $OPI_{3\_11}$ mis-align check, because an alignment must be performed on a word basis to be able to prevent a page fault when a code is loaded into a memory, the virtual addresses of symbols in an init section, a code section, and a data section must end with 0, 4, 8, or C, as illustrated in FIG. 12. Thus, the addresses for the symbols in the sections are an interface of the $OPI_{3\_11}$.

Figure 13:
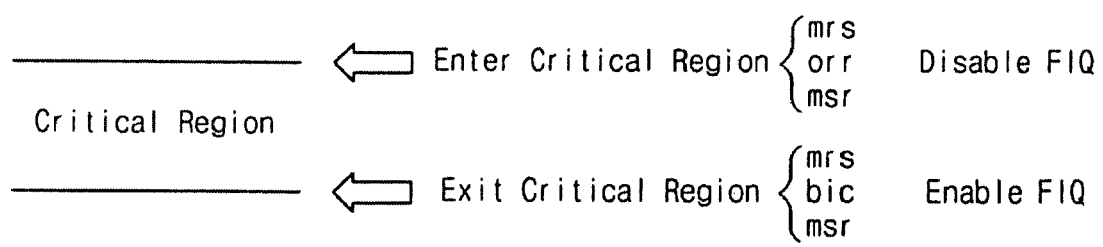

An $OPI_{3\_12}$ critical region test is used to test whether a critical region is protected from a fast interrupt request (FIQ). As illustrated in FIG. 13, the call addresses of commands mrs, orr and msr for disabling the FIQ simultaneously with critical region entry and the call addresses of commands mrs, bic and msr for enabling the FIQ simultaneously with critical region release are an interface of the $OPI_{3\_12}$.

The test case generator 12 generates a test case that covers a test target LCD device driver interface detected by the test target analyzer 11. The test case is constructed to include an interface symbol corresponding to an input, which is to be monitored in each interface, data of the interface symbol, and an expected output.

A test case for each of the LCD device driver interface characteristics is determined according to each LCD device driver interface location and type. Table 3 shows expected output reference locations that can be used instead of expected output values. The reason for this is that an output value changes every time it is monitored through operation of the emulator 20.

TABLE 3

| Interface Symbols | | Expected Output Reference Locations | Pass/Fail Determination Method |
|---|---|---|---|
| $HPI_{1\_1}$ | Symbol address and symbol size | Memory map containing physical memory information | Compare the sum of symbol address and symbol size with physical memory address |
| $HPI_{1\_2}$ | Symbol address and symbol size | R13_SVC register for monitoring kernel stack | Compare the sum of symbol address and symbol size with kernel stack |
| $HPI_{1\_3}$ | Symbol address and symbol size | R13_USR register for monitoring user stack | Compare the sum of symbol address and symbol size with user stack |
| $HPI_{2\_1}$ | Start point of fb_mmap, end point of fb_mmap | Variable for measuring the time from start of fb_mmap to end of fb_mmap | Measure the time from start to end of fb_mmap |
| $OPI_{3\_1}$ | Call address of stmia and idmia of do_IRQ according to _irq_svc | R0~R12 register containing context information | Compare R0~R12 register value of stmia with R0~R12 register value of Idmia |
| $OPI_{3\_2}$ | Call address of stmia and idmia of do_IRQ according to _irq_svc | Variable for measuring the time from stmia call to Idmia call | Measure the time from stmia call to Idmia call |
| $OPI_{3\_3}$ | Call address of do_IRQ | R0 register for obtaining IRQ number after call | Check ISR execution suitable for IRQ number obtained from R0 |

TABLE 3-continued

| Interface Symbols | | Expected Output Reference Locations | Pass/Fail Determination Method |
|---|---|---|---|
| $OPI_{3\_4}$ | Call address of do_IRQ | R0 register for obtaining IRQ number after call | Check ISR execution suitable for IRQ number obtained from R0 |
| $OPI_{3\_5}$ | Call address of kmalloc( ) | R0 register for obtaining size after call | Obtain the size of kmalloc( ) |
| | | Memory map containing physical memory information | Compare the sum of call address and size with physical memory address |
| $OPI_{3\_6}$ | Call addresses of __arch_copy_from_user( ), __arch_strncpy_from_user( ) and get_user( ) | R2 register for obtaining size after call | Obtain the size of __arch_copy_from_user( ), __arch_strncpy_from_user( ), get_user( ) |
| | | R13_SVC register for monitoring kernel stack | Compare the sum of call address and size with kernel stack |
| $OPI_{3\_7}$ | Call addresses of copy_to_user( ), put_user( ) and __arch_clear_user( ) | R2 register for obtaining size after call | Obtain the size of copy_to_user( ), put_user( ), __arch_clear_user( ) |
| | | R13_USR register for monitoring user stack | Compare the sum of call address and size with user stack |
| $OPI_{3\_8}$ | Call addresses of memset( ), -memzero( ) and memcpy( ) | R2 register for obtaining size after call | Obtain the size of memset( ), __memzero( ), memcpy( ) |
| | | R1 register for monitoring destination symbol address in heap space | Compare the sum of call address and size with destination symbol address |
| $OPI_{3\_9}$ | Call address of kfree( ) | R0 register for obtaining release address after call | Check whether R0 value is 0x0000000 and check whether it is release for allocated area |
| $OPI_{3\_10}$ | Call addresses of kmem_cache_free_one( ) and kfree( ) | Variable for measuring the time from kfree( ) call to kmem_cache_free_one( ) call | Measure the time from kfree( ) to kmem_cache_free_one( ) |
| $OPI_{3\_11}$ | Virtual addresses of symbols in init section, code section and data section | Last bit in each virtual address | Check whether last bit of each virtual address is 0, 4, 8, C |
| $OPI_{3\_12}$ | Addresses of mrs, orr, msr and mrs, bic, msr | FIQ bit of current program status register | Check whether CPSR FIQ bit value is 1 or 0 at the call of mrs, orr, msr and mrs, bic, msr |

Test cases generated by the test case generator 12 are constructed in the format of a test script suitable for batch run by the emulator 20. An interface symbol in Table 3 is a location for setting a break point (BP) of a test script, and an expected output reference location in Table 3 is a location that is to be monitored for determination of pass/fail at the location of the interface symbol.

FIG. 14 illustrates a test script for test of collision with an $OPI_{3\_6}$ kernel stack.

Referring to FIG. 14, BPs are set at the called addresses of functions _arch_copy_from_user( ), _arch_strncpy_from_user( ) and get_user( ). A value obtained by adding the size from an R2 register in the emulator must not collide with a stack pointer (SP) of a kernel stack at the set location. At this point, a stack point (SP) of the kernel stack is monitored by a debugger of the emulator 20 using the value of an R13_SVC register.

An exemplary embodiment of the present invention provides a method for automatically generating an interface test case for the interface test of a LINUX-based LCD device driver. The LINUX-based LCD device driver is exemplified as being developed on an S3C2440 board having a TRACE32-ICD emulator and an ARM processor.

Figure 15:
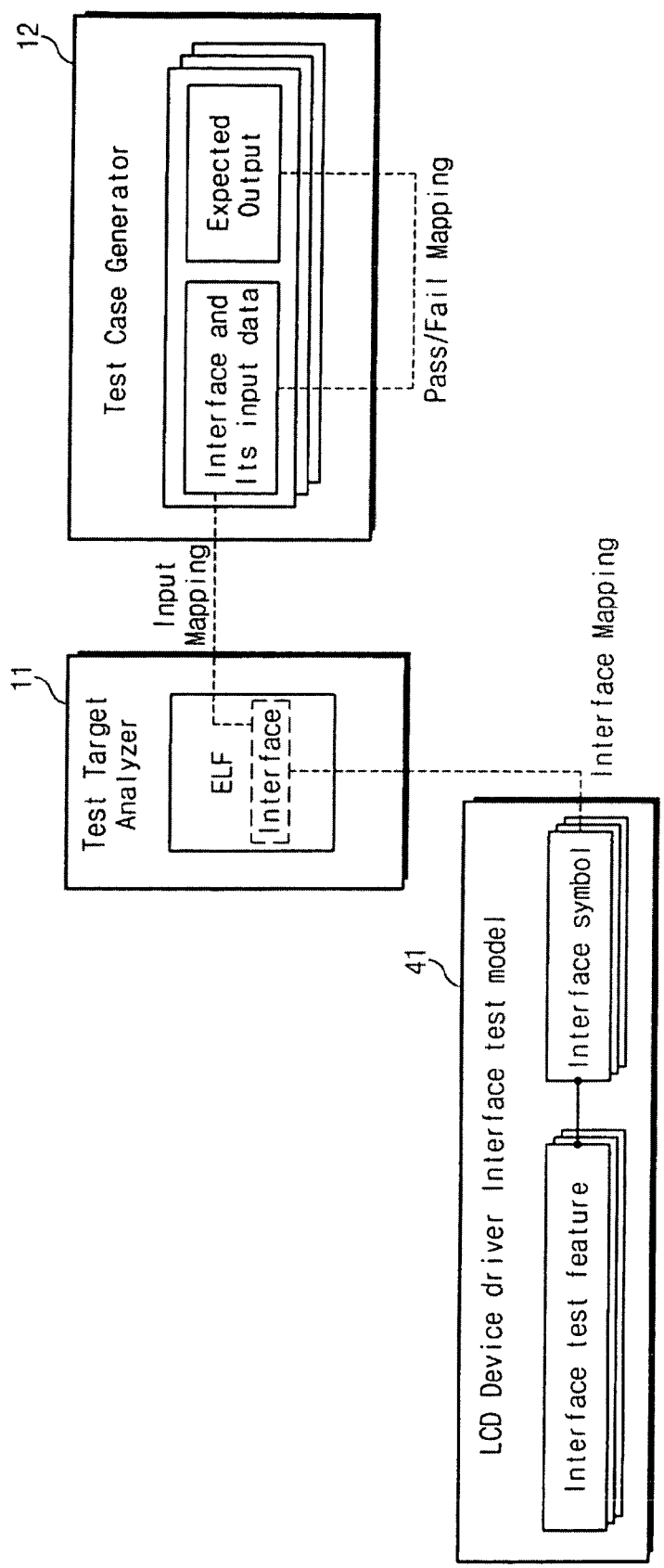
FIG. 15 is a block diagram illustrating generation of a test case for testing an interface of embedded software according to the present invention.

FIG. 15 is a block diagram illustrating generation of a test case for testing an interface of embedded software according to the present invention.

Referring to FIG. 15, in an automatic test case generation method for the interface test of an LCD device driver, a test target analyzer 11 automatically identifies interface test characteristics specified in a test model 41 and an interface symbol where each of the interface test characteristics is mapped in an object code. The test case generator 12 receives the identified interface symbol, and automatically generates a test case using pass/fail criteria based on the input interface symbol.

Figure 16:
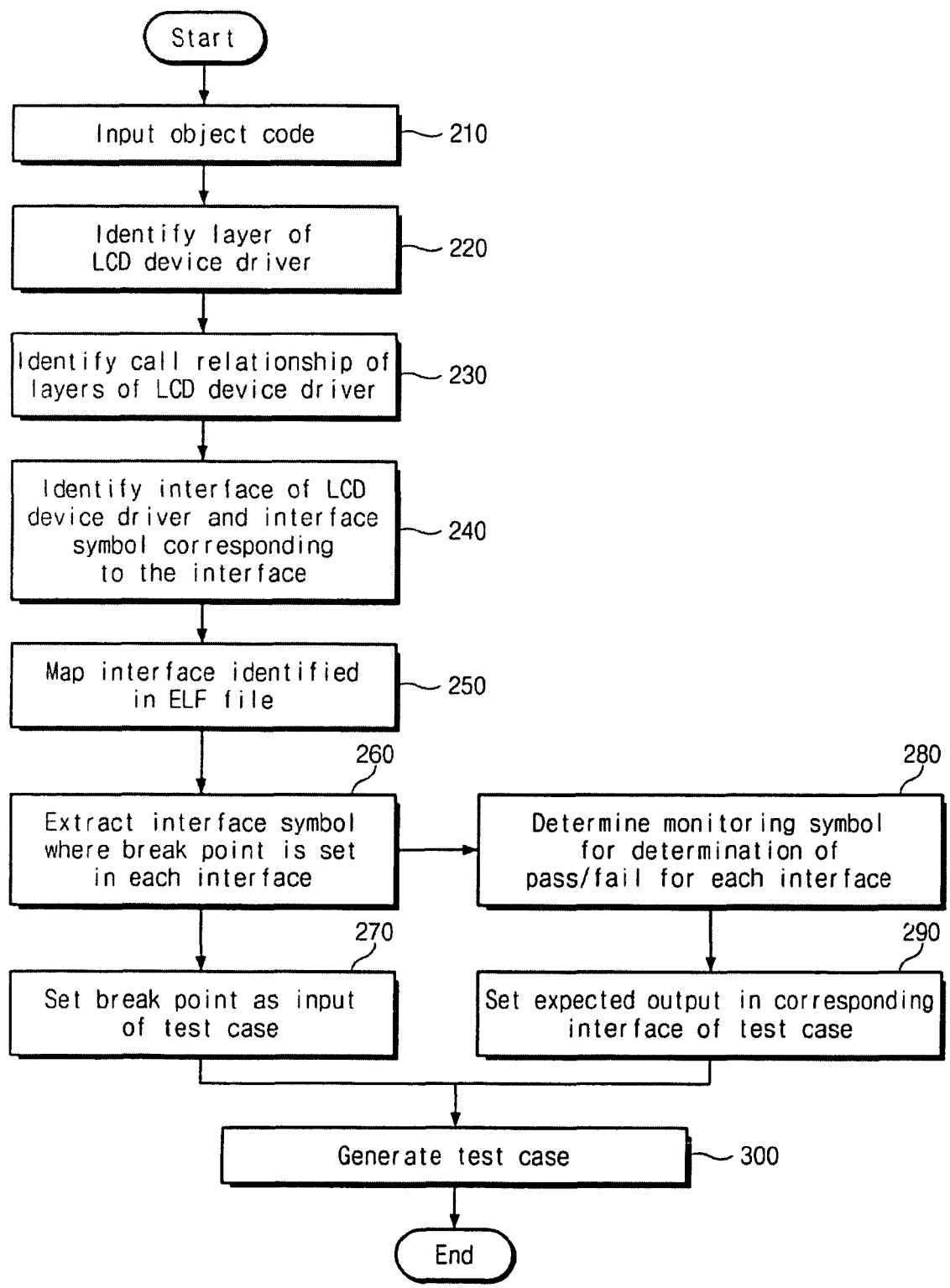
FIG. 16 is a flowchart illustrating a method of generating a test case for testing an interface of embedded software according to an embodiment of the present invention.

FIG. 16 is a flowchart illustrating a method of generating a test case for testing an interface of embedded software according to an embodiment of the present invention. In an embodiment of the present invention, an LCD device driver is exemplified as the embedded software 41.

Referring to FIGS. 1 and 16, the LINUX server 40 provides an object code of the LCD device driver 41 to the test target analyzer 11 (step 210). The LINUX server 40 may also provide a source code of the LCD device driver 41 to the test target analyzer 11. From the object code of the LCD device driver 41, the test target analyzer 11 generates an ELF file using ARM processor-based commands objdump –t, objdump –I –S and readelf –wi.

The test target analyzer 11 identifies a layer of the LCD device driver 41 (step 220). That is, the test target analyzer 11 identifies an inter-layer interface of the LCD device driver 41 according to classified definitions. For example, it is determined whether the structure of sub-functions of the LCD device driver 41 corresponds to the interface defined in Table 1. The test target analyzer 11 identifies the call relationship of the LCD device driver (step 230). That is, only sub-functions called between interfaces are selected as a test target.

For the sub-functions called between interfaces, the test target analyzer 11 identifies an interface of the LCD device driver, which is defined in Table 2, and an interface symbol to be tested in the interface (step 240). In order to automatically identify a location where the interface symbol is mapped in the source code, the test target analyzer 11 maps the interface symbols of the LCD device driver corresponding to $HPI_1$, $HPI_2$, $OPI_1$, $OPI_2$ and $OPI_3$ from the ELF file and the object code of the LCD device driver (step 250). The test target analyzer 11 extracts a location of the mapped symbol and the test case generator 12 sets each break point in the interface extracted by the test target analyzer 11 (step 260). The test case generator 12 sets each break point as an input of a test case (step 270). The test case generator 12 determines monitoring symbols that are to be monitored for determination of pass/fail for each interface (step 280). Based on this, an expected output of a corresponding interface is set (step 290). That is, a test case is generated using the input and the expected output. At this point, the test case is generated in a script format suitable for batch run in the emulator (step 300).

The method for generating the test case for the interface test of the LINUX-based LCD device driver according to the present invention combines the debugging/monitoring function of the emulator with the interface testing function, thereby supporting fault detection and fault cause estimation and automating the test for the LINUX-based LCD device driver.

Accordingly, the present invention automatically identifies the interface symbols for software of all layers that are organically linked with the LCD device driver, including the LINUX-based LCD device driver and the kernel related thereto.

In addition, the present invention automatically generates the test case for the interface test of the LINUX-based LCD device driver. The present invention automatically identifies the test case covering the interface of the identified LINUX-based LCD device driver, and adds a function for automatically determining the pass/fail of a test input symbol to the test case, thereby determining the test pass/fail automatically when the generated test case is executed.

As described above, the present invention makes it possible to automatically generate a test case for the interface test of a device driver.

In addition, the present invention can automatically identify the test case covering the interface of the device driver, and can add the function for automatically determining the pass/fail of the test input symbol to the test case, thereby making it possible to automatically determine the test pass/fail when the generated test case is executed.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method executable by a processor for testing embedded software in an embedded system, wherein the embedded software is a liquid crystal display (LCD) device driver, comprising:
   identifying an interface test feature associated with the LCD device driver, the interface test feature being associated with an interface symbol, the interface symbol enabling measurement of the interface test feature; and
   extracting a location in the LCD device driver associated with the interface symbol,
   wherein identifying the interface test feature includes:
      transmitting one of a source code and an object code of the LCD device driver from the device to a test target analyzer;
      identifying a plurality of layers in the LCD device driver; and
      identifying a call relationship associated with a first layer and a second layer of the plurality of layers, and
   wherein the method further comprises:
      setting a break point based on the location of the interface symbol;
      setting a pass/fail criterion for testing the interface test feature based on the interface symbol;
      generating a test case for testing the software using the break point and the pass/fail criterion; and
      executing the test case using an LCD emulator.

2. The method of claim 1, wherein generating the test case includes setting an expected output associated with the interface test feature.

3. The method of claim 2, wherein generating the test case is based on a script format.

4. The method of claim 1, wherein identifying the plurality of layers includes discriminating between a plurality of software units and a plurality of hardware units.

5. The method of claim 4, wherein identifying the plurality of layers further includes:
   discriminating between each of the plurality of software units; and
   discriminating between each of the plurality of hardware units.

6. The method of claim 1, wherein the interface symbol is associated with one of an operating system-dependent Part interface (OPI) and a hardware-dependent Part interface (HPI).

7. The method of claim 6, wherein extracting the location includes identifying at least one of an operating system-dependent Part interface (OPI) and a hardware-dependent Part interface (HPI) in an executable linker file (ELF) associated with the software.

8. The method of claim 1, wherein the software includes a software unit and a hardware unit.

9. The method of claim 8, wherein the software unit includes at least one of a kernel-dependent software unit ($SU_k$), a device-dependent software unit ($SU_d$), and a processor-dependent software unit ($SU_p$), and the hardware unit includes at least one of a hardware unit_d ($HU_d$) capable of performing a read/write operation directly from software to hardware and a hardware unit_i ($HU_i$) whose read/write operation is controlled indirectly through an address of the $HU_d$.

10. The method of claim 9, wherein the interface symbol includes at least one of:
   an $HPI_1$ used by the $SU_d$ or the $SU_p$ to read/write a value into the $HU_d$;
   an $HPI_2$ used by the $SU_d$ or the $SU_p$ to control the $HU_i$ through an address of the $HU_d$;

an $OPI_i$ used by the $SU_d$ or the $SU_p$ to call an $SU_k$ irrelevant to the control of the $HU_d$ and the $HU_i$;

an $OPI_2$ used by the $SU_d$ or the $SU_p$ to call an $SU_k$ relevant to the control of a virtual memory; and an $OPI_3$ used by the $SU_d$ or the $SU_p$ to call an $SU_k$ relevant to the control of the $HU_d$ and the $HU_i$.

11. An apparatus having a processor for testing embedded software in an embedded system, wherein the embedded software is a liquid crystal display (LCD) device driver, comprising:

a server system containing the embedded LCD device driver;

a host system including a test target analyzer, a test case generator and a test executing engine; and an LCD emulator coupled to the test executing engine, the emulator configured to execute a test case under control of the test executing engine, the test target analyzer configured to identify an interface test feature associated with the LCD device driver, the interface test feature being associated with an interface symbol, the interface symbol enabling measurement of the interface test feature, and to extract a location in the LCD device driver associated with the interface symbol, the test case generator coupled to the test target analyzer and configured to set a break point based on the location of the interface symbol; to set a pass/fail criterion for testing the interface test feature based on the interface symbol; and to generate the test case for testing the software using the break point and the pass/fail criterion, and the test executing engine coupled to the test case generator and configured to receive the test case, wherein, in identifying the interface test feature, the test target analyzer is configured to receive one of a source code and an object code of the LCD device driver from the host device, to identify a plurality of layers in the LCD device driver, and to identify a call relationship associated with a first layer and a second layer of the plurality of layers.

12. The apparatus of claim 11, wherein the host system further comprises a result analyzer coupled to the emulator, the result analyzer configured to compare an output of the emulator to an expected output.

13. The apparatus of claim 11, wherein the server system is a LINUX server.

* * * * *